(12) United States Patent
Hwang et al.

(10) Patent No.: US 11,837,728 B2
(45) Date of Patent: Dec. 5, 2023

(54) ANODE ACTIVE MATERIAL AND LITHIUM SECONDARY BATTERY INCLUDING THE SAME

(71) Applicant: SK Innovation Co., Ltd., Seoul (KR)

(72) Inventors: Hae Suk Hwang, Daejeon (KR); Hee Gyoung Kang, Daejeon (KR); Hyo Sang Kim, Daejeon (KR); So Hyun Park, Daejeon (KR); Jong Hyuk Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 145 days.

(21) Appl. No.: 17/394,679

(22) Filed: Aug. 5, 2021

(65) Prior Publication Data

US 2022/0045327 A1 Feb. 10, 2022

(30) Foreign Application Priority Data

Aug. 5, 2020 (KR) ........................ 10-2020-0098124

(51) Int. Cl.
*H01M 4/00* (2006.01)
*H01M 4/583* (2010.01)
*H01M 4/133* (2010.01)
*H01M 4/66* (2006.01)
*H01M 4/62* (2006.01)
*H01M 10/0525* (2010.01)
*H01M 4/02* (2006.01)

(52) U.S. Cl.
CPC .......... *H01M 4/583* (2013.01); *H01M 4/133* (2013.01); *H01M 4/623* (2013.01); *H01M 4/662* (2013.01); *H01M 10/0525* (2013.01); *H01M 2004/021* (2013.01)

(58) Field of Classification Search
CPC .............................. H01M 4/587; Y02E 60/10
See application file for complete search history.

(56) References Cited

FOREIGN PATENT DOCUMENTS

| KR | 10-0326446 B1 | 2/2002 | |
|---|---|---|---|
| KR | 10-0567113 B1 | 3/2006 | |
| KR | 10-2014-0140323 A | 12/2014 | |
| KR | 10-2017-0007140 A | 1/2017 | |
| WO | 2018/087928 A1 | 5/2018 | |
| WO | WO-2019026265 A1 * | 2/2019 | ............ H01M 4/587 |

OTHER PUBLICATIONS

Nakamura ey al. Negative Electrode Material for Lithium Ion Secondary Batteries, Negative Electrode Material Slurry for Lithium Ion Secondary Batteries, Negative Electrode for Lithium Ion Secondary Batteries, and Lithium Ion Secondary Battery, See the Abstract. (Year: 2019).*

* cited by examiner

*Primary Examiner* — Cynthia H Kelly
*Assistant Examiner* — Monique M Wills
(74) *Attorney, Agent, or Firm* — IP & T GROUP LLP

(57) ABSTRACT

An anode active material according to an embodiment of the present invention includes a first graphite particle and a second graphite particle having a different particle diameter from that of the first graphite particle. A ratio of a pellet density relative to a. tap density of the anode active material is from 1.3 to 1.45. A particle deformation of the anode is suppressed to achieve a lithium secondary battery having improved long-term and high-energy properties.

10 Claims, 1 Drawing Sheet

ANODE ACTIVE MATERIAL AND LITHIUM SECONDARY BATTERY INCLUDING THE SAME

CROSS-REFERENCE TO RELATED APPLICATION AND CLAIM OF PRIORITY

This application claims priority to Korean Patent Application No. 10-2020-0098124 filed on Aug. 5, 2020 in the Korean Intellectual Property Office (KIPO), the entire disclosure of which is incorporated by reference herein.

BACKGROUND

1. Field

The present invention relates to an anode active material, an anode for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

In early lithium secondary batteries, a lithium metal was used as an anode active material, but a carbon-based material such as graphite is replacing the lithium metal due to safety issues during repeated charging/discharging.

The anode active material formed of the carbon-based material has an electrochemical reaction potential with lithium ions similar to that of the lithium metal, and changes in a crystal structure during continuous insertion/desorption of the lithium ion may hardly occur in the carbon-based material to provide continuous charging/discharging and enhanced a charge-discharge lifespan.

To implement lithium secondary batteries having higher capacity/power, the anode active material is coated on a current collector, and pressed with high pressure to increase a density of an active material layer and a discharging capacity per volume. However, the active material layer with sufficiently high-density may not be easily obtained from the conventional carbon-based material.

Recently, as an application of the lithium secondary battery is expanded, the lithium secondary having higher power and capacity is being developed. For example, cathode or anode materials capable of providing higher capacity are researched. Accordingly, applying a composite of silicon and carbon to an anode is researched.

However, the composite of silicon and carbon may cause a significant volume expansion during charging and discharging.

For example, Korean Registered Patent Publication No. 10-0326446 discloses an anode active material including a spherical carbon-based material, which may not provide sufficiently high density and energy.

SUMMARY

According to an aspect of the present invention, there is provided an anode active material having improved operational stability and electrical property.

According to an aspect of the present invention, there is provided an anode mixture and an anode for a lithium secondary battery having improved operational stability and electrical property.

According to an aspect of the present invention, there is provided a lithium secondary battery having improved operational stability and electrical property According to exemplary embodiments of the present invention, an anode active material includes a first graphite particle, and a second graphite particle having a different particle diameter from that of the first graphite particle. A pellet density and a tap density of the anode active material satisfy a relation of Equation 1:

$$1.3 \leq D_P/D_T \leq 1.45 \qquad \text{[Equation 1]}$$

In Equation 1, $D_P$ is the pellet density (g/cm$^3$) of the anode active material, and $D_T$ is the tap density (g/cm$^3$) of the anode active material.

The pellet density is calculated using a height difference measured after putting 1 g of the anode active material into a cylindrical pelletizer with a diameter of 13 mm and pressurizing the pelletizer with 3 metric ton for 10 seconds.

The tap density is measured from a volume and a weight of a sample obtained after filling the sample of 10 g of the anode active material in 25 ml measuring cylinder, and then tapping with a stroke length of 10 mm 3,000 times.

In some embodiments, the second graphite particle may include artificial graphite having a hardness higher than that of the first graphite particle.

In some embodiments, an amount of the second graphite particle may be in a range from 20 wt % to 40 wt % based on a total weight of the anode active material.

In some embodiments, the first graphite particle and the second graphite particle satisfy Equation 2:

$$0.3 \leq D_2/D_1 \leq 0.56 \qquad \text{[Equation 2]}$$

In Equation 2, $D_1$ is an average particle diameter ($D_{50}$, μm) of the first graphite particle, and $D_2$ is an average particle diameter ($D_{50}$, μm) of the second graphite particle.

In some embodiments, the average particle diameter ($D_{50}$) of the first graphite particle may be from 16 μm to 19 μm.

In some embodiments, an average particle diameter ($D_{50}$) of the second graphite particle may be from 7 μm to 9 μm.

In some embodiments, the first graphite particle may include an assembly type artificial graphite.

According to exemplary embodiments of the present invention, an anode mixture for a lithium secondary battery includes the anode active material as described above and having a density of 1.8 g/cm$^3$ or more.

In some embodiments, the anode mixture further includes a solvent, a conductive agent and a binder.

According to exemplary embodiments of the present invention, an anode for a. lithium secondary battery includes an anode current collector, and an anode active material layer formed on the anode current collector, the anode active material layer including the anode active material as described above.

According to exemplary embodiments of the present invention, a lithium secondary battery includes a cathode, and an anode facing the cathode and including the anode active material as described above.

An anode active material according to exemplary embodiments of the present invention may include a first graphite particle and a second graphite particle, and a ratio of a pellet density relative to a tap density of the anode active material may be in a range from 1.3 to 1.45. Thus, a particle deformation of the anode may be suppressed to provide a lithium secondary battery having a high energy density while securing long-term properties.

In some embodiments, the second graphite particle may include a high-hardness artificial graphite and may be included in an amount of 20 wt % to 40 wt % based on a total weight of the anode active material. Thus, hard particles with a low deformation degree may serve as a support in a process of applying pressure to an electrode such as a pressing process to prevent cracks in the anode active material and to achieve high-temperature storage and life-span properties of the lithium secondary battery.

DETAILED DESCRIPTION)F THE EMBODIMENTS

Figure 1:
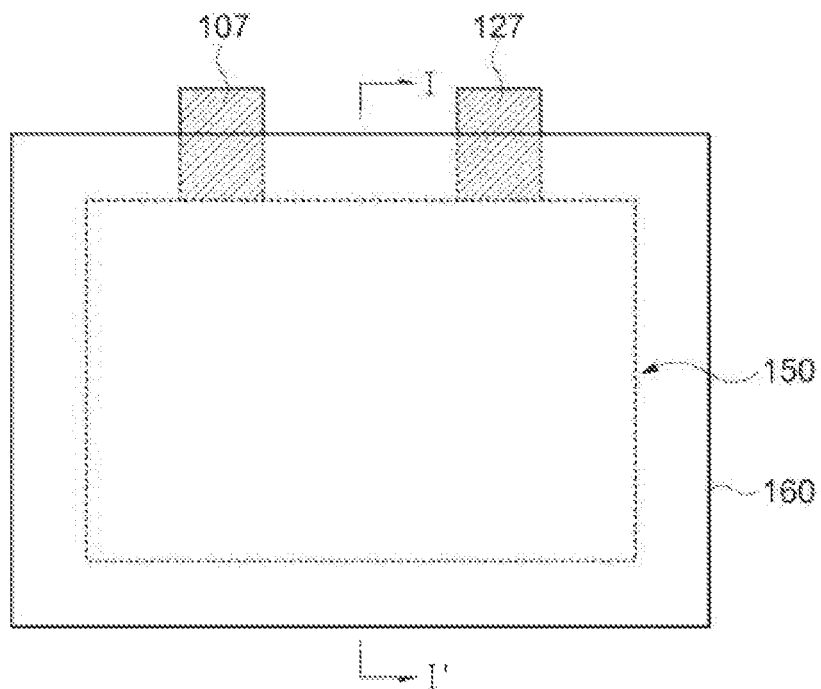
FIGS. 1 and 2 are a schematic top planar view and a schematic cross-sectional view, respectively, illustrating a lithium secondary battery in accordance with exemplary embodiments.

According to exemplary embodiments of the present invention, an anode active material including a first graphite particle and a second graphite particle having different diameter to have a density ratio in a predetermined range is provided. According to exemplary embodiments of the present invention, an anode mixture and an anode formed using the anode active material and a lithium secondary battery including the anode are also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

<Anode Active Material>

An anode active material according to embodiments of the present invention may include first graphite particles and second graphite particles having different particle diameters, and may satisfy Equation 1 below, $$1.3 \leq D_P/D_T \leq 1.45 \quad \text{[Equation 1]}$$

In Equation 1, $D_P$ is a pellet density (g/cm$^3$) of the anode active material, and $D_T$ is a tap density (g/cm$^3$) of the anode active material.

In a calculation of the "pellet density" of the anode active material, 1 g of the anode active material is put into a cylindrical pelletizer a diameter of 13 mm, a pressure is applied to the pelletizer with 3 metric ton for 10 seconds, and then a height of the pelletizer is measured. A height difference from an initial vacant pelletizer may be used to obtain the pellet density. For example, a manual type pressure may be used to press the pelletizer.

In a measurement of the "tap density", 10 g of the anode active material is filled in 25ml measuring cylinder, and then a tap with a stroke length of 10 mm is performed 3,000 times to obtain the tap density from a volume and a weight of the sample. An average value of 3 measurements may be used as the tap density.

As expressed by the Equation 1 above, in the anode active material according to exemplary embodiments of the present invention, a ratio of the pellet density relative to the tap density may be 1.3 or more and 1.45 or less, Preferably, the ratio of the pellet density to the tap density of the anode active material may be 1.35 or more.

If the ratio of the pellet density to the tap density is 1.45 or less as expressed in Equation 1, deformation of the anode electrode active material and a volume expansion of the anode may be effectively suppressed to provide an electrode having high energy and high density. If the ratio of the pellet density to the tap density exceeds 1.45, physical damages such as cracks may be caused to the anode active material during a pressing process and a side reaction between ⁻the anode active material and an electrolyte may occur during repeated charging and discharging.

If the ratio of the pellet density to the tap density is less than 1.3, a density of the anode mixture formed from the anode may be reduced, a high-density electrode may not be formed, and a rate property of the secondary battery may be degraded.

The anode active material for the lithium secondary battery may function as a material to absorb and desorb lithium ions, and graphite particles may be used as the anode active material. The first and second graphite particles may include, e.g., at least one of artificial graphite, natural graphite, graphitized carbon fiber, graphitized meso-carbon microbead, petroleum cokes, a sintered resin, carbon fiber, pyrolytic carbon, etc.

Shapes of the first and second graphite particles may not be specifically limited if the anode active material for the lithium secondary battery is capable of intercalating and de-intercalating lithium ions. In an embodiment, spherical or plate-shaped active material may be used for improving a performance of the anode active material.

In some embodiments, the second graphite particles may include a high-hardness artificial graphite, e.g., a high-hardness crushed artificial graphite. Thus, the second graphite particle may effectively serve as a support for the anode of the lithium second battery, and particle deformation of the anode active material in the pressing process may be suppressed. Accordingly, a particle destruction due to penetration or decomposition reaction of the electrolyte may be prevented to provide long-term properties of the battery.

In some embodiments, the second graphite particle may be included in an amount of 20 weight percent (wt %) to 40 wt % based on a total weight of the anode active material.

If an amount of the second graphite particle is less than 20 wt % based on the total weight of the anode active material, the graphite particles may be easily crushed by the pressing process and a lithium-ion diffusivity may be deteriorated, thereby reducing charge/discharge properties and cycle properties.

If the amount of the second graphite particles exceeds 40 wt % based on the total weight of the anode active material, pores may exist in the anode due to being insufficiently pressed in the pressing process, and thus the high-density anode mixture may not be formed. Further, cracks may be caused in adjacent heterogeneous graphite particles, which may be disadvantageous in securing the long-term properties such as high temperature storage and life-span properties.

In some example embodiments, the first graphite particles may include an assembly type artificial graphite.

Natural graphite may have a needle-like or plate-like particle shape and has a large surface area due to an irregular structure. Thus, when being applied to a battery, natural graphite may be easily destroyed by the electrolyte penetration or decomposition reaction of the electrolyte, and irreversible reactions may significantly occur.

Thus, the assembly type artificial graphite may be included so that a change of the shape of the particles may be suppressed, and an elastic deformation and a gap reduction between particles may be promoted in the pressing process. Thus, the high-density electrode may be efficiently achieved.

In exemplary embodiments, the first graphite particle and the second graphite particle may satisfy Equation (2) below.

$$0.3 \leq D_2/D_1 \leq 0.56 \qquad \text{[Equation 2]}$$

In Equation 2, $D_1$ is an average particle diameter ($D_{50}$, μm) of the first graphite particles, and $D_2$ is an average particle diameter (D50, μm) of the second graphite particles.

Throughout the present specification, "$D_{50}$ average particle diameter" refers to as a volume average value $D_{50}$ (i.e., a particle diameter when a cumulative volume becomes 50%) in a particle size distribution measurement by a laser light diffraction method, and the term "average particle size" refers to the $D_{50}$ average particle size unless otherwise defined.

As expressed by Equation 2, a ratio of an average particle diameter of the second graphite particles relative to an average particle diameter of the first graphite particles in the anode active material according to the embodiments of the present invention may be from 0.3 to 0.56. Preferably, the ratio of the average particle diameter of the second graphite particles relative to the average particle diameter of the first graphite particles may be from 0.35 to 0.5. More preferably, the ratio of the average particle diameter of the second graphite particles relative to the average particle diameter of the first graphite particles may be from 0.4 to 0.45.

If the ratio of the average particle diameter of the second graphite particles relative to the average particle diameter of the first graphite particles is less than 0.3, pores may not be formed in the anode to interfere with an impregnation of the electrolyte and to cause an increase of a cell resistance and a decrease of a discharging capacity per volume of the battery.

If the ratio of the average particle diameter of the second graphite particles relative to the average particle diameter of the first graphite particles exceeds 0.56, a density of the anode may be lowered to degrade charge/discharge and cycle properties.

In some embodiments, the average particle diameter of the first graphite particles may be from 16 μm to 19 μm, and the average particle diameter of the second graphite particles may be from 7 μm to 9 μm. Within this range, pores between the anode active materials may be properly achieved to more effectively prevent a material deformation of the anode. Further, an anode density may be more easily enhanced to improve charge/discharge efficiency and life-span property.

In exemplary embodiments, as described above, the pellet density may he measured using a volume change after a pressurization performed by inputting the anode active material sample in a container and then pressurizing with a predetermined pressure.

For example, the pellet density of the anode active material may be measured according to Equation 3 below by pressurizing at a pressure of 2000 kgf/cm².

$$\text{pellet density} = W/[\pi \times (13/2)^2 \times (H2-H1)/1000] \qquad \text{[Equation 3]}$$

In the Equation 3 above, W (g) is a weight of the sample, H2 (mm) is a height of a pelletizer after the pressurization, and H1 is a height of the pelletizer before the pressurization.

<Anode for Lithium Secondary Battery and Lithium Secondary Battery>

Figure 2:
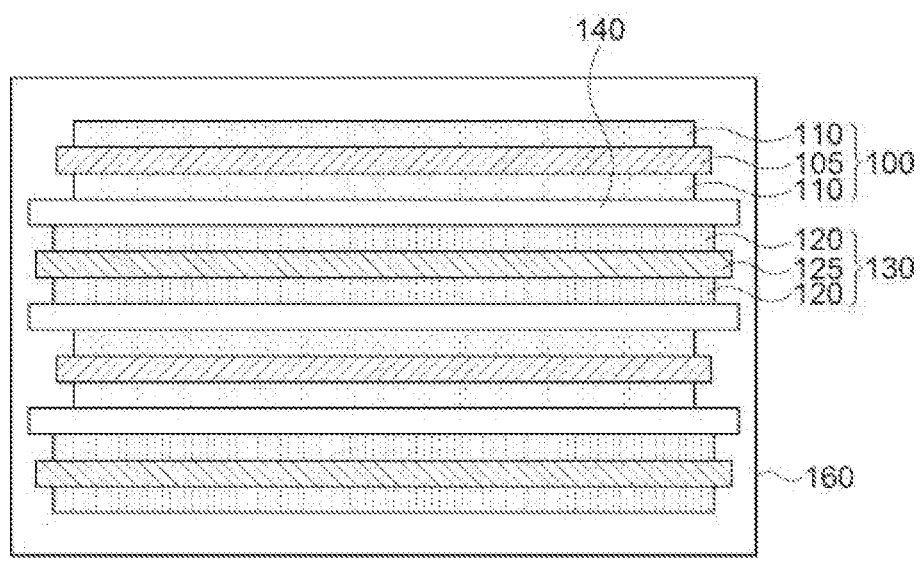

FIGS. 1 and 2 are a schematic top planar view and a schematic cross-sectional view, respectively, illustrating a lithium secondary battery in accordance with exemplary embodiments.

Referring to FIGS. 1 and 2, the lithium secondary battery may include an electrode assembly including a cathode 100, an anode 130 and a separation layer 140 interposed between the cathode and the anode. The electrode assembly may be accommodated in a case 160 together with the electrolyte to be impregnated therein.

The cathode 100 may include a cathode active material layer 110 formed by coating a cathode active material on a cathode current collector 105.

The cathode current collector 105 may include stainless-steel, nickel, aluminum, titanium, copper or an alloy thereof. Preferably, aluminum or an alloy thereof may be used. The cathode current collector 105 may be surface-treated using carbon, nickel, titan silver, etc.

The cathode active material may include a compound capable of reversibly intercalating and de-intercalating lithium ions.

In exemplary embodiments, the cathode active material may include a lithium-transition metal oxide. For example, the lithium-transition metal oxide may include nickel (Ni), and may further include at least one of cobalt (Co) and manganese (Mn).

For example, the lithium-transition metal oxide may be represented by Chemical Formula 1 below.

$$Li_{1+a}Ni_{1-(x+y)}Co_xM_yO_2 \qquad \text{[Chemical Formula 2]}$$

In the Chemical Formula 2 above, $-0.05 \geq a \geq 0.15$, $0.01 \geq x \geq 0.3$, $0.01 \leq y \leq 0.3$, and M may include at least one element selected from Mn, Mg, Sr, Ba, B, Al, Si, Ti, Zr and W.

A mixture may be prepared by mixing and stirring the cathode active material in a solvent with a binder, a conductive agent and/or a dispersive agent. The mixture may be coated on the cathode current collector 105, and then pressed and dried to form the cathode 100, The solvent may include a non-aqueous solvent. Non-limiting examples of the solvent may include N-methyl-2-pyrrolidone (NMP), di methylformamide, dimethylacetamide, N,N-dimethylaminopropylamine, ethylene oxide, tetrahydrofuran, etc.

The binder may include an organic based binder such as a polyvinylidene fluoride-hexaftuoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive agent may be added to facilitate electron mobility between active material particles. For example, the conductive agent may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed by coating an anode mixture including an anode active material on the anode current collector 125.

In exemplary embodiments; an anode mixture for a lithium secondary battery according to exemplary embodiments may have a density of 1.8 $g/cm^3$ or more. Thus, the lithium secondary battery having improved long-term storage performance while maintaining a high energy density may be provided.

For example, the anode active material as described above may be mixed and stirred together with the above-mentioned binder, conductive agent; thickener, etc., in a solvent to form the anode mixture. The anode mixture may be coated on at least one surface of the anode current collector 125, and pressed and dried to form the anode 130.

The solvent may include a non-aqueous solvent. Non-limiting examples of the solvent may include N-methyl-2-pyrrolidone (NMP), dimethylformamide, dimethylacetamide, N,N-dimethylaminopropylamine, ethylene oxide, tetrahydrofuran, etc.

The binder widely used in the related art may be used, and may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

An amount of the binder may be properly adjusted in consideration of the formation of the electrode. In an embodiment, the amount of the binder may be 3 wt % or less based on a total weight of the anode active material and the binder for enhancing a resistance property in the anode. In an embodiment, the amount of the binder may be from 0.5 wt % to 3 wt %.

The conductive agent may include a carbon-based conductive material widely used in the related art.

The anode current collector 125 may include a metal having high conductivity and improved adhesion to the anode mixture and not having a reactivity in a voltage range of the battery. For example, the anode current collector 125 may include stainless steel, nickel, copper, titanium, or an alloy thereof, preferably copper or a copper alloy may be used. The anode current collector 125 may be surface-treated with carbon, nickel, titanium, silver, or the like.

According to an embodiment of the present invention, an electrode density of the anode active material layer 120 formed by coating the anode active material may be 1.45 $g/cm^3$ or more. Within the above range, power, life-span, and high-temperature storage properties of the battery may be more efficiently enhanced.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation.

In exemplary embodiments, an electrode cell may be defined by the cathode 100, the anode 130 and the separation layer 140, and a plurality of the electrode cells may he stacked to form an electrode assembly 150 that may have e.g., a jelly roll shape. For example, the electrode assembly 150 may be formed by winding, laminating or folding the separation layer 140.

The electrode assembly 150 may be accommodated together with an electrolyte in the case 160 to define a lithium secondary battery. In exemplary embodiments, a non-aqueous electrolyte may be used as the electrolyte.

For example, the non-aqueous electrolyte may include a lithium salt and an organic solvent. The lithium salt commonly used in the electrolyte for the lithium secondary battery may be used, and may be represented by $LP^+X^-$.

An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethvl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 1, electrode tabs (a cathode tab and an anode tab) may protrude from the cathode current collector 105 and the anode electrode current collector 125 included in each electrode cell to one side of the case 160. The electrode tabs may he welded together with the one side of the case 160 to form an electrode lead (a cathode lead 107 and an anode 127) extending or exposed to an outside of the case 160.

The lithium secondary battery may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Examples and Comparative Examples

<Anode>

As shown in Table 1, an assembly-type artificial graphite (the first graphite particle) and a high-hardness crushed artificial graphite (the second graphite particle) were mixed to prepare an anode active material.

In a calculation of the pellet density $D_p$ as shown in Table 1, 1 g of the anode active material was put into a cylindrical pelletizer with a diameter of 13 mm, a pressure was applied to the pelletizer with 3 metric ton for 10 seconds using a manual type pressure, and then a height of the pelletizer is measured. A height difference from an initial vacant pelletizer was used to obtain the pellet density.

In a measurement of the tap density $D_T$ as shown in Table 1, 10 g of the anode active material was filled in 25 ml measuring cylinder, and the measuring cylinder was fixed to a tap apparatus. Tapping and rotating were performed simultaneously 3,000 times, and then the tap density was measured using a volume after dropping.

TABLE 1

| | First Graphite Particle | | Second Graphite Particle | | Anode Active Material | | |
|---|---|---|---|---|---|---|---|
| | $D_{50}$ (μm) | Mixing Weight (g) | $D_{50}$ (μm) | Mixing Weight (g) | Tap Density (g/cm³) | Pellet Density (g/cm³) | $D_P/D_T$ |
| Example 1 | 16 | 7.5 | 7 | 2.5 | 1.05 | 1.50 | 1.43 |
| Example 2 | 16 | 7 | 7 | 3 | 1.01 | 1.43 | 1.42 |
| Example 3 | 16 | 6.5 | 7 | 3.5 | 1.02 | 1.43 | 1.40 |
| Example 4 | 16 | 6 | 7 | 4 | 0.99 | 1.30 | 1.31 |
| Example 5 | 16 | 6 | 7.5 | 4 | 1.03 | 1.39 | 1.35 |
| Example 6 | 16 | 6.5 | 8 | 3.5 | 0.98 | 1.35 | 1.38 |
| Example 7 | 19 | 7 | 7.5 | 3 | 1.04 | 1.48 | 1.42 |
| Example 8 | 17 | 7 | 9 | 3 | 1.03 | 1.40 | 1.36 |
| Comparative Example 1 | 19 | 7 | 9 | 3 | 0.99 | 1.50 | 1.52 |
| Comparative Example 2 | 18 | 7.5 | 7 | 2.5 | 1.01 | 1.58 | 1.56 |
| Comparative Example 3 | 17 | 7 | 8 | 3 | 1.08 | 1.35 | 1.25 |

The prepared anode active material, styrene butadiene rubber (SBR) and carboxymethylcellulose (CMC) as a thickener were mixed in a mass ratio of 97.8:1.2:1.0 and then dispersed in distilled water from which ions were removed to prepare an anode mixture for a lithium secondary battery. Densities of the anode mixture including the anode active material prepared in Examples 1 to 8 and Comparative Examples 1 to 3 are shown in Table 2 below.

TABLE 2

| | Mixture Density (g/cm³) |
|---|---|
| Example 1 | 1.81 |
| Example 2 | 1.82 |
| Example 3 | 1.81 |
| Example 4 | 1.80 |
| Example 5 | 1.81 |
| Example 6 | 1.81 |
| Example 7 | 1.82 |
| Example 8 | 1.83 |
| Comparative Example 1 | 1.65 |
| Comparative Example 2 | 1.71 |
| Comparative Example 3 | 1.82 |

The anode mixture was coated on one surface of a Cu-foil current collector, dried and pressed to form an anode active material layer having a size of 10 cm×10 cm×50 μm to prepare the anode.

<Cathode>

$Li_{1.0}Ni_{0.6}Co_{0.2}Mn_{0.2}O_2$ as a cathode active material, Denka Black as a conductive agent, PVDF as a binder and N-Methyl pyrrolidone as a solvent were mixed in a weight ratio of 46:1.5:50 to prepare a cathode mixture. The cathode mixture was coated on an aluminum substrate, and then dried and pressed to form a cathode.

<Battery>

The cathode and the anode obtained as described above were notched with a proper size and stacked, and a separator (polyethylene, thickness: 13 μm) was interposed between the cathode and the anode to form an electrode cell. Each tab portion of the cathode and the anode was welded.

The welded cathode/separator/anode assembly was inserted in a pouch, and three sides of the pouch except for an electrolyte injection side were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by dissolving 1M $LiPF_6$ in a mixed solvent of EC/EMC/DEC (25/45/30; volume ratio), and then 1 wt % of vinylene carbonate, 0.5 wt % of 1,3-propensultone (PRS), and 0.5 wt % of lithium bis (oxalato) borate (LiBOB) were added.

Thereafter, pre-charging was performed for 36 minutes with a current (2.5A) corresponding to 0.250. After 1 hour of degasing and aging for more than 24 hours, a charging and discharging for a formation was performed (charge condition CC-CV 0.2C 4.2V 0.05C CUT-OFF, discharge condition CC 0.2C 2.5V CUT-OFF). Subsequently, a standard charging and discharging was performed (charge condition CC-CV 0.5 C 4.2V 0.05C CUT-OFF, discharge condition CC 0.5C 2.5V CUT-OFF).

Experimental Example

<Measurement of on Initial Charge/discharge Capacities>

Charging (CC/CV 0.1C 4.3V 0.0050 CUT-OFF) and discharging (CC 0.1C 3.0V CUT-OFF) were performed once for the battery cells according to Examples and Comparative Examples to measure initial charge and discharge capacities (CC: constant current, CV: constant voltage).

<Evaluation on Initial Efficiency>

Initial efficiency was measured as a percentage value obtained by dividing the measured initial discharge capacity by the initial charge capacity.

<Evaluation of Rate Property>

After performing charging (CC/CV 0.1C 4.3V 0.0050 CUT-OFF) and discharging (CC 0.1C 3.0V CUT-OFF) once for the battery cells according to Examples and Comparative Examples, charging (CC/CV 0.5C 4.3V 0.0050 CUT-OFF) and discharge (CC 4.0C 3.0V CUT-OFF) were performed once again. A value obtained by dividing the 4.0C discharge capacity by the 0.1C discharge capacity was converted into a percentage (%) to evaluate the rate property.

<Evaluation on Capacity Retention (Life-span property)

Charging (CC/CV 0.5C 4.3V 0.050 CUT-OFF) and discharging (CC 1.0C 3.0V CUT-OFF) were performed 200 times for the battery cells according to Examples and Comparative Examples. Life-span retention was evaluated as a percentage of the value dividing the discharge capacity at the 200th cycle by the discharge capacity at the first cycle.

The results are shown in Table 3 below.

TABLE 31

| | Initial Charging Capacity (mAh/g) | Initial Discharging Capacity (mAh/g) | Initial Efficiency | Rate property (1C/0.1C) | Capacity Retention |
|---|---|---|---|---|---|
| Example 1 | 333 | 297 | 89.2 | 91.5 | 96.4 |
| Example 2 | 328 | 289 | 88.1 | 92.1 | 98.7 |

TABLE 31-continued

|  | Initial Charging Capacity (mAh/g) | Initial Discharging Capacity (mAh/g) | Initial Efficiency | Rate property (1C/0.1C) | Capacity Retention |
|---|---|---|---|---|---|
| Example 3 | 329 | 288.9 | 87.8 | 90.0 | 95.6 |
| Example 4 | 334 | 793.9 | 88.0 | 89.9 | 97 |
| Example 5 | 336 | 298.7 | 88.9 | 90.3 | 90.1 |
| Example 6 | 335 | 296.5 | 88.5 | 91.2 | 93 |
| Example 7 | 331 | 296.9 | 89.7 | 90.9 | 92 |
| Example 8 | 332 | 298.5 | 89.9 | 89.0 | 89.8 |
| Comparative Example 1 | 310 | 248.0 | 80.0 | 88.3 | 78.1 |
| Comparative Example 2 | 308 | 249.5 | 81.0 | 87.6 | 73.2 |
| Comparative Example 3 | 303 | 245 | 80.8 | 85.0 | 71.2 |

Referring to Table 3, in the case of Examples in which the ratio of the pellet density to the tap density satisfies Equation 1, the charging/discharging efficiencies and capacity retentions greater than those from Comparative Examples were obtained.

What is claimed is:

1. An anode active material, comprising:
   a first artificial graphite particle; and
   a second artificial graphite particle having a different particle diameter from that of the first graphite particle and a hardness higher than that of the first graphite particle, wherein a pellet density and a tap density of the anode active material satisfy a relation of Equation 1:

$$1.3 \leq D_P/D_T \leq 1.45 \qquad \text{[Equation 1]}$$

wherein, in Equation 1, $D_P$ is the pellet density (g/cm$^3$) of the anode active material, and $D_T$ is the tap density (g/cm$^3$) of the anode active material,
   wherein, the pellet density is calculated using a height difference measured after putting 1 g of the anode active material into a cylindrical pelletizer with a diameter of 13 mm and pressurizing the pelletizer with 3 metric ton for 10 seconds,
   wherein the tap density is measured from a volume and a weight of a sample obtained after filling the sample of 10 g of the anode active material in 25 ml measuring cylinder, and then tapping with a stroke length of 10 mm 3,000 times.

2. The anode active material of claim 1, wherein an amount of the second graphite particle is in a range from 20 wt % to 40 wt % based on a total weight of the anode active material.

3. The anode active material of claim 1, wherein the first graphite particle and the second graphite particle satisfy Equation 2:

$$0.3 \leq D_2/D_1 \leq 0.56 \qquad \text{[Equation 2]}$$

wherein, in Equation 2, $D_1$ is an average particle diameter ($D_{50}$, μm) of the first graphite particle, and $D_2$ is an average particle diameter ($D_{50}$, μm) of the second graphite particle.

4. The anode active material of claim 1, wherein the average particle diameter ($D_{50}$) of the first graphite particle is from 16 μm to 19 μm.

5. The anode active material according to claim 1, wherein an average particle diameter ($D_{50}$) of the second graphite particle is from 7 μm to 9 μm.

6. The anode active material of claim 1, wherein the first graphite particle includes an assembly type artificial graphite.

7. An anode mixture for a lithium secondary battery comprising the anode active material of claim 1 and having a density of 1.8 g/cm$^3$ or more.

8. The anode mixture for a lithium secondary battery of claim 7, further comprising a solvent, a conductive agent and a binder.

9. An anode for a lithium secondary battery, comprising:
   an anode current collector; and
   an anode active material layer formed on the anode current collector, the anode active material layer comprising the anode active material of claim 1.

10. A lithium secondary battery, comprising:
    a cathode; and
    an anode facing the cathode and comprising the anode active material of claim 1.

* * * * *